US010364514B2

(12) United States Patent
Abusleme et al.

(10) Patent No.: US 10,364,514 B2
(45) Date of Patent: Jul. 30, 2019

(54) FLUOROPOLYMER FIBRE

(71) Applicant: SOLVAY SA, Brussels (BE)

(72) Inventors: Julio A. Abusleme, Saronno (IT); Giambattista Besana, Mariano Comense (IT); Mattia Bassi, Milan (IT); Christine Hamon, Arese (IT); Chiara Gualandi, Comune di Molinel (IT); Maria Letizia Focarete, Bologna (IT); Andrea Zucchelli, Crevalcore (IT)

(73) Assignee: SOLVAY SA, Brussels (BE)

( * ) Notice: Subject to any disclaimer, the term of this patent is extended or adjusted under 35 U.S.C. 154(b) by 215 days.

(21) Appl. No.: 14/905,443

(22) PCT Filed: Jul. 15, 2014

(86) PCT No.: PCT/EP2014/065080
§ 371 (c)(1),
(2) Date: Jan. 15, 2016

(87) PCT Pub. No.: WO2015/007706
PCT Pub. Date: Jan. 22, 2015

(65) Prior Publication Data
US 2016/0160392 A1   Jun. 9, 2016

(30) Foreign Application Priority Data

Jul. 15, 2013   (EP) ..................................... 13176447

(51) Int. Cl.
*D01F 6/32*       (2006.01)
*B01D 71/32*   (2006.01)
(Continued)

(52) U.S. Cl.
CPC ........... *D01F 6/32* (2013.01); *B01D 67/0079* (2013.01); *B01D 71/32* (2013.01); *B01D 71/76* (2013.01); *C08F 214/18* (2013.01); *D01D 5/003* (2013.01); *D01D 5/0038* (2013.01); *D01F 1/10* (2013.01); *D01F 6/48* (2013.01); *D02J 1/00* (2013.01); *D04H 1/4318* (2013.01); *D04H 1/728* (2013.01); *H01M 10/0525* (2013.01); *D10B 2321/042* (2013.01); *D10B 2321/08* (2013.01); *D10B 2401/06* (2013.01); *D10B 2401/061* (2013.01); *D10B 2401/16* (2013.01);
(Continued)

(58) Field of Classification Search
CPC .. D01F 6/48; D01F 6/32; B01D 71/76; B01D 67/0079; H01M 10/0525; D02J 1/00; D02J 1/002
See application file for complete search history.

(56) References Cited

U.S. PATENT DOCUMENTS

| 2002/0100725 A1 | 8/2002 | Lee et al. | |
| 2012/0003524 A1* | 1/2012 | Jo | B01D 67/0013 429/144 |
| 2012/0164514 A1 | 6/2012 | Hayakawa et al. | |
| 2013/0023620 A1* | 1/2013 | Abusleme | C08F 8/00 524/546 |
| 2014/0315080 A1* | 10/2014 | Abusleme | C08F 214/186 429/189 |

FOREIGN PATENT DOCUMENTS

| JP | 2002/249966 A | 9/2002 |
| JP | 2008/243419 A | 10/2008 |

(Continued)

OTHER PUBLICATIONS

Cozza E.S. et al., "Preparation, characterization and properties of nanofibers based on poly(vinylidene fluoride) and polyhedral oligomerix silsesquioxane", Polymers for Advanced Technologies, Dec. 8, 2001, vol. 23, No. 9, p. 1252-1257—DOI: 10.1002/pat.2037.

*Primary Examiner* — Peter D. Mulcahy (57) ABSTRACT

The present invention pertains to a process for manufacturing one or more fluoropolymer fibers, said process comprising the following steps: (i) providing a liquid composition [composition (C1)] comprising: —at least one fluoropolymer comprising at least one hydroxyl end group [polymer ($F_{OH}$)L and —a liquid medium comprising at least one organic solvent [solvent (S)]; (ii) contacting the composition (C1) provided in step (i) with at least one metal compound [compound (M)] of formula (I) here below: $X_{4-m}AY_m$ (I) wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group, thereby providing a liquid composition [composition (C2)]; (iii) submitting to at least partial hydrolysis and/or polycondensation the composition (C2) provided in step (ii) thereby providing a liquid composition [composition (C3)] comprising at least one fluoropolymer hybrid organic/inorganic composite; (iv) processing the composition (C3) provided in step (iii) by electrospinning thereby providing one or more fluoropolymer fibers; (v) drying the fluoropolymer fiber(s) provided in step (iv); and (vi) optionally, submitting to compression the fluoropolymer fiber(s) provided in step (v) at a temperature comprised between 50° C. and 300° C. The invention also pertains to a process for the manufacture of said fluoropolymer fiber(s) and to uses of said fluoropolymer fiber(s) in various applications.

19 Claims, 1 Drawing Sheet

(51) Int. Cl.
    *C08F 214/18*     (2006.01)
    *D04H 1/4318*     (2012.01)
    *D04H 1/728*     (2012.01)
    *D01D 5/00*     (2006.01)
    *D01F 1/10*     (2006.01)
    *D01F 6/48*     (2006.01)
    *B01D 67/00*     (2006.01)
    *B01D 71/76*     (2006.01)
    *D02J 1/00*     (2006.01)
    *H01M 10/0525*     (2010.01)
    *H01M 2/16*     (2006.01)
    *H01M 10/052*     (2010.01)

(52) U.S. Cl.
    CPC ...... *D10B 2505/00* (2013.01); *D10B 2505/04* (2013.01); *H01M 2/162* (2013.01); *H01M 2/1686* (2013.01); *H01M 10/052* (2013.01)

(56) References Cited

FOREIGN PATENT DOCUMENTS

| | | | |
|---|---|---|---|
| JP | 2010/044935 A | | 2/2010 |
| JP | 4803984 B2 | | 10/2011 |
| WO | 2011/033975 A1 | | 3/2011 |
| WO | 2013072216 A1 | | 5/2013 |
| WO | WO-2013/072216 A1 | * | 5/2013 |

\* cited by examiner

FLUOROPOLYMER FIBRE

This application is a U.S. national stage entry under 35 U.S.C. § 371 of International Application No. PCT/EP2014/065080 filed Jul. 15, 2014, which claims priority to European application No. 13176447.4 filed on Jul. 15, 2013, the whole content of this application being incorporated herein by reference for all purposes. The entire contents of these applications are explicitly incorporated herein by this reference.

TECHNICAL FIELD

The present invention pertains to a fluoropolymer fibre, to a process for its manufacture and to uses of said fluoropolymer fibre in various applications. In particular, the present invention pertains to a fluoropolymer mat, to a process for its manufacture and to uses of said fluoropolymer mat in various applications.

BACKGROUND ART

Energy storage systems, including electrochemical devices such as Lithium-ion batteries having high energy densities, increasingly have to comply with safety requirements to meet the growing demand for large-size electrochemical cells.

One of the most critically important components to ensure safety of an electrochemical cell is the separator, whose primary function is to prevent physical and electric contact between the positive electrode and the negative electrode of the electrochemical cell while permitting electrolyte ions to flow there through.

The separator must be chemically and electrochemically stable towards the electrolyte and the electrode materials and must be mechanically strong to withstand high tensions generated during battery assembly operations. Also, its structure and properties considerably affect battery performances, including energy density, power density, cycle life as well as safety.

For high energy and power densities, the separator is required to be very thin and highly porous while still remaining mechanically strong.

For battery safety, the separator should be able to shut the battery down when overheating occurs so that thermal runaway, causing dimensional shrinking or melting of the separator, which results in physical contact of the electrodes, and the resulting internal short circuit can be avoided.

Also, a low thickness of the separator is required for high energy and power densities. However, this adversely affects the mechanical strength of the separator and the safety of the battery thereby provided.

Inorganic composite membranes have been widely used as separators for electrochemical devices including secondary batteries, in particular Lithium-ion batteries.

A variety of inorganic filler materials have been long used to fabricate inorganic composite membranes wherein inorganic particles are distributed throughout a polymeric binder matrix.

Although inorganic composite membranes offer excellent wettability by the electrolytes, good thermal stability and zero-dimensional shrinkage at high temperatures, they are usually not mechanically strong enough to withstand handling in cell winding and assembly.

In many cases, the inorganic composite membrane contains a very high content of inorganic filler materials. In some instances, the inorganic composite membrane so obtained exhibits poor mechanical strength.

One particular challenge has been to provide for multilayer composite membranes with acceptable thickness to be suitably used as separators in electrochemical devices.

Multilayer composite membranes can be obtained using multiple coating steps. However, multiple steps disadvantageously increase processing costs.

For instance, US 2013/0023620 (SOLVAY SPECIALTY POLYMERS ITALY S.P.A.) 24 Jan. 2013 discloses use of fluoropolymer hybrid organic/inorganic composites for the manufacture of separators for Lithium-ion batteries, said fluoropolymer hybrid organic/inorganic composites being obtainable by reacting functional fluoropolymers having hydroxyl groups with hydrolysable compounds of Si, Ti or Zr.

Also, WO 2013/072216 (SOLVAY SPECIALTY POLYMERS ITALY S.P.A.) 23 May 2013 discloses polymer electrolyte separators based on fluoropolymer hybrid organic/inorganic composites obtainable by reacting functional fluoropolymers having hydroxyl groups with hydrolysable compounds of Si, Ti or Zr.

Further, US 2012/0003524 (KOREA INSTITUTE OF SCIENCE AND TECHNOLOGY) 5 Jan. 2012 discloses a process for manufacturing by electrospinning ultrafine fibrous composite separators from a mixture of a metal oxide and a polymer resin solution.

Similarly, MONTICELLI, O., et al. Preparation, characterization and properties of nanofibers based on poly(vinylidene fluoride) and polyhedral oligomeric silsesquioxane. Polymers for Advanced Technologies. Dec. 8, 2011, vol. 23, no. 9, p. 1252-1257. discloses electrospun composite nanofibers based on poly(vinylidene fluoride) and polyhedral oligomeric silsesquioxanes (POSS) such as epoxycyclohexylisobutyl POSS.

There is thus still the need in the art for an alternative process for manufacturing membranes having high porosity and thus high ionic conductivity to be suitably used as separators in electrochemical devices while maintaining outstanding thermo-mechanical properties during operation of the same.

SUMMARY OF INVENTION

It has been now found that by using a fluoropolymer hybrid organic-inorganic composite, said composite comprising fluoropolymer domains and inorganic domains, fibres can easily be formed by the process of the invention, said fibres advantageously leading to fluoropolymer mats endowed with high porosity and good thermo-mechanical properties to be suitably used in a variety of applications.

In particular, it has been found that the fluoropolymer mat according to the invention advantageously contains a high content of inorganic domains while exhibiting outstanding thermo-mechanical resistance properties and retaining its inherent porosity up to temperatures of about 300° C., thus being particularly suitable for use as separator in electrochemical devices.

Also, the fluoropolymer mat according to the invention is advantageously flexible and has low compressibility values, thus being particularly easy to handle.

In a first instance, the invention pertains to a process for manufacturing one or more fluoropolymer fibres, said process comprising the following steps:

(i) providing a liquid composition [composition (C1)] comprising:

at least one fluoropolymer comprising at least one hydroxyl end group [polymer ($F_{OH}$)], and
a liquid medium comprising at least one organic solvent [solvent (S)];
(ii) contacting the composition (C1) provided in step (i) with at least one metal compound [compound (M)] of formula (I) here below:

$$X_{4-m}AY_m \quad (I)$$

wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group,
thereby providing a liquid composition [composition (C2)];
(iii) submitting to at least partial hydrolysis and/or polycondensation the composition (C2) provided in step (ii) thereby providing a liquid composition [composition (C3)] comprising at least one fluoropolymer hybrid organic/inorganic composite;
(iv) processing the composition (C3) provided in step (iii) by electrospinning thereby providing one or more fluoropolymer fibres;
(v) drying the fluoropolymer fibre(s) provided in step (iv); and
(vi) optionally, submitting to compression the fluoropolymer fibre(s) provided in step (v) at a temperature comprised between 50° C. and 300° C.

Figure 1:
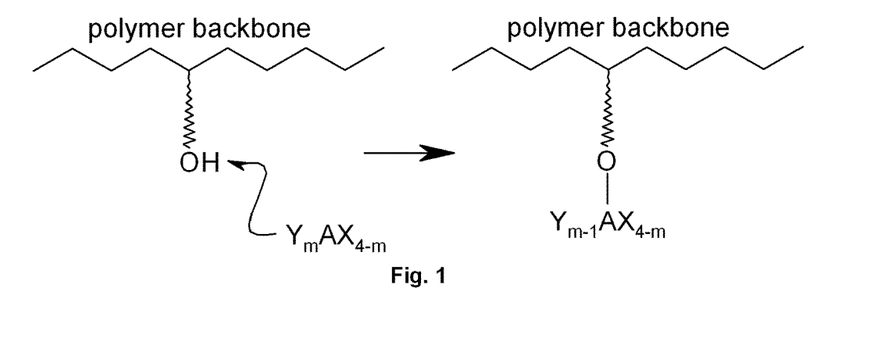
FIG. 1 is a schematic representation of the reaction of at least a fraction of the hydroxyl group(s) of a polymer with at least a fraction of the hydrolysable group(s) Y of the compound(s) (M).

Under step (ii) of the process of the invention, a liquid composition [composition (C2)] is advantageously obtainable by reacting, as notably sketched in FIG. 1, at least a fraction of the hydroxyl group(s) of the polymer(s) ($F_{OH}$) with at least a fraction of the hydrolysable group(s) Y of the compound(s) (M), said composition (C2) comprising:
at least one grafted fluoropolymer [polymer (Fg)] comprising pendant groups of formula $-AY_{m-1}X_{4-m}$, wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group,
a liquid medium comprising at least one solvent (S), and
optionally, residual amounts of at least one compound (M) of formula (I) as defined above.

Under step (iii) of the process of the invention, a liquid composition [composition (C3)] is advantageously obtainable by reacting by at least partial hydrolysis and/or polycondensation the hydrolysable group(s) Y of the compound(s) (M) and/or the pendant groups of formula $-AY_{m-1}X_{4-m}$ of the polymer (Fg), wherein X, A, Y and m have the same meaning as defined above, said composition (C3) comprising:
at least one fluoropolymer hybrid organic/inorganic composite comprising, preferably consisting of, fluoropolymer domains consisting of chains obtainable by the polymer (Fg) and inorganic domains consisting of residues obtainable by the compound (M),
a liquid medium comprising at least one solvent (S), and
optionally, at least one compound (M) of formula (I) as defined above and/or derivatives thereof obtainable by at least partial hydrolysis and/or polycondensation.

Figure 2:
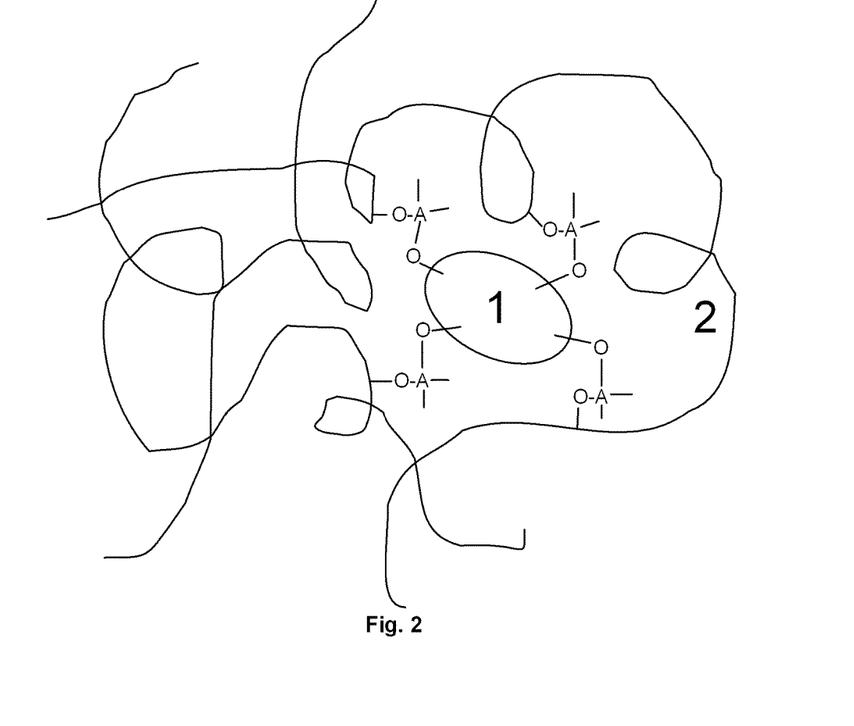
FIG. 2 is a schematic representation of a fluoropolymer hybrid organic/inorganic composite which includes fluoropolymer domains (2) consisting of chains obtainable by polymer (Fg) and inorganic domains (1) consisting of residues obtainable by compound (M).

It is understood that, as notably sketched in FIG. 2, the fluoropolymer hybrid organic/inorganic composite of the invention comprises, preferably consists of, fluoropolymer domains [domains (2)] consisting of chains obtainable by the polymer (Fg) and inorganic domains [domains (1)] consisting of residues obtainable by the compound (M).

It is also understood that, while the hydrolysis and/or polycondensation reaction may be initiated during step (ii) of the process of the invention, while reacting at least a fraction of the hydroxyl group(s) of the polymer(s) ($F_{OH}$) with at least a fraction of the hydrolysable group(s) Y of the compound(s) (M), said reaction may be continued during any one of steps (iii) to (vi) of the process of the invention.

In a second instance, the present invention pertains to one or more fluoropolymer fibres obtainable by the process of the invention.

For the purpose of the present invention, by the term "fluoropolymer fibre" it is meant a single, continuous filament having a finite length.

The fluoropolymer fibre of the invention typically comprises, preferably consists of, at least one fluoropolymer hybrid organic-inorganic composite as provided either in step (v) or (vi) of the process of the invention.

The fluoropolymer fibre of the invention typically comprises, preferably consists of:
at least one fluoropolymer hybrid organic-inorganic composite comprising, preferably consisting of, fluoropolymer domains consisting of chains obtainable by the polymer (Fg) and inorganic domains consisting of residues obtainable by the compound (M),
optionally, at least one compound (M) of formula (I) as defined above, and
optionally, at least one derivative obtainable by at least partial hydrolysis and/or polycondensation of at least one compound (M) of formula (I) as defined above.

It is understood that, by at least partial hydrolysis and/or polycondensation of a compound (M) of formula (I) as defined above, derivatives of said compound (M) are typically provided having any of formulae (I-a) to (I-c) here below:

wherein X, Y and A have the same meaning as defined above, in formula (I-a) m' is 0 or an integer from 1 to 3 and n' is an integer from 1 to 4 with the proviso that the (m'–n') sum is an integer from 1 to 4, in formula (I-b) m" is 0, 1 or 2 and n" is an integer from 1 to 3 with the proviso that the (m"+n") sum is an integer from 1 to 3, and in formula (I-c) m" is 0, 1, or 2.

The fluoropolymer fibre of the invention has an average diameter usually ranging from 50 nm to 500 nm, preferably from 100 nm to 300 nm.

According to an embodiment of the process of the invention, the fluoropolymer fibres provided under step (iv) are assembled thereby providing either a bundle of fluoropolymer fibres or a fluoropolymer mat.

For the purpose of the present invention, by the term "fluoropolymer mat" it is meant a fabric having a finite thickness, said fabric consisting of randomly distributed fluoropolymer fibres and/or bundles of fluoropolymer fibres held together to form numerous pores.

Thus, in a third instance, the present invention pertains to a fluoropolymer mat comprising, preferably consisting of, fluoropolymer fibres and/or bundles of fluoropolymer fibres as defined above.

The fluoropolymer mat of the invention is typically a non-woven fabric.

By "non-woven fabric" it is intended to denote a planar textile structure obtainable by randomly interlocking or bonding fibres together by mechanical, thermal or chemical means.

The fluoropolymer mat of the invention is advantageously obtainable by the process of the invention.

The fluoropolymer mat of the invention has a thickness usually ranging from 2 μm to 300 μm, preferably from 5 μm to 100 μm, more preferably from 10 μm to 50 μm.

The fluoropolymer mat of the invention has a porosity usually ranging from 10% to 90%, preferably from 30% to 80%, more preferably from 50% to 70% based on the total volume of the fluoropolymer mat.

In a fourth instance, the present invention pertains to use of either the fluoropolymer fibre of the invention or the fluoropolymer mat of the invention in various applications.

In particular, in a fifth instance, the present invention pertains to use of the fluoropolymer mat provided either in step (v) or in step (vi) of the process of the invention for manufacturing a multilayer assembly.

Thus, the present invention also pertains to a multilayer assembly comprising:
at least one fluoropolymer mat as provided either in step (v) or in step (vi) of the process of the invention, and
at least one substrate layer,
wherein at least one surface of said fluoropolymer mat is adhered to at least one surface of said substrate layer.

Non-limitative examples of substrates suitable for use in the manufacture of said multilayer assemblies include porous substrates, preferably porous substrates made of polymers such as polyolefins and fluoropolymers.

The substrate layer typically has a thickness comprised between 2 μm and 40 μm.

The fluoropolymer mat of the invention or the multilayer assembly of the invention may be advantageously used as separator for electrochemical devices.

Non-limitative examples of suitable electrochemical devices include, notably, secondary batteries, especially, alkaline or alkaline-earth secondary batteries such as Lithium-ion batteries, and capacitors, especially Lithium-ion capacitors.

The separator according to the invention is particularly suitable for use in secondary batteries.

In a sixth instance, the present invention thus pertains to a secondary battery comprising the separator according to the invention.

The secondary battery of the invention typically comprises the following components:
the separator according to the invention;
a negative electrode;
an electrolyte comprising a charge carrying medium and at least one metal salt; and
a positive electrode.

The separator according to the invention is commonly located between the positive electrode and the negative electrode of the secondary battery.

The fluoropolymer mat of the invention or the multilayer assembly of the invention may also be advantageously used as filtration membrane.

Non-limitative examples of filtration membranes which can be manufactured using the process of the invention include, notably, membranes which can be used in the chemical processing industry in various separation processes, such as micro-filtration and ultra-filtration membranes, in particular porous hollow-fibre membranes for use in water filtration.

The filtration membranes so manufactured can also be used in biomedical applications, e.g. for haemodialysis, for controlled release of drugs, for artificial tissues and organs, such as kidney, lung and pancreas.

For the purpose of the present invention, by the term "fluoropolymer" it is meant a polymer comprising recurring units derived from at least one fluorinated monomer.

The polymer ($F_{OH}$) of the invention comprises recurring units derived from at least one fluorinated monomer and at least one comonomer comprising at least one hydroxyl end group [comonomer (MA)].

The term "at least one fluorinated monomer" is understood to mean that the polymer ($F_{OH}$) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one comonomer (MA)" is understood to mean that the polymer ($F_{OH}$) may comprise recurring units derived from one or more than one comonomers (MA) as defined above. In the rest of the text, the expression "comonomer (MA)" is understood, for the purposes of the present invention, both in the plural and the singular, that is to say that they denote both one or more than one comonomers (MA) as defined above.

The comonomer (MA) of the polymer ($F_{OH}$) may be selected from the group consisting of fluorinated monomers comprising at least one hydroxyl end group and hydrogenated monomers comprising at least one hydroxyl end group.

By the term "fluorinated monomer" it is hereby intended to denote an ethylenically unsaturated monomer comprising at least one fluorine atom.

By the term "hydrogenated monomer" it is hereby intended to denote an ethylenically unsaturated monomer comprising at least one hydrogen atom and free from fluorine atoms.

The polymer ($F_{OH}$) comprises preferably at least 0.01% by moles, more preferably at least 0.05% by moles, even more preferably at least 0.1% by moles of recurring units derived from at least one comonomer (MA) as defined above.

The polymer ($F_{OH}$) comprises preferably at most 20% by moles, more preferably at most 15% by moles, even more preferably at most 10% by moles, most preferably at most 3% by moles of recurring units derived from at least one comonomer (MA) as defined above.

Determination of average mole percentage of comonomer (MA) recurring units in polymer ($F_{OH}$) can be performed by any suitable method. Mention can be notably made of acid-base titration methods, well suited e.g. for the determination of the acrylic acid content, of NMR methods, adequate for the quantification of comonomers (MA) comprising aliphatic hydrogen atoms in side chains, of weight balance based on total fed comonomer (MA) and unreacted residual comonomer (MA) during polymer ($F_{OH}$) manufacture.

The comonomer (MA) is typically selected from the group consisting of hydrogenated monomers comprising at least one hydroxyl group.

The comonomer (MA) is preferably selected from the group consisting of (meth)acrylic monomers of formula (II) or vinylether monomers of formula (III):

wherein each of $R_1$, $R_2$ and $R_3$, equal to or different from each other, is independently a hydrogen atom or a $C_1$-$C_3$ hydrocarbon group, and $R_{OH}$ is a $C_1$-$C_5$ hydrocarbon moiety comprising at least one hydroxyl group.

The comonomer (MA) more preferably complies with formula (II) as defined above.

The comonomer (MA) even more preferably complies with formula (II-A):

wherein $R'_1$, $R'_2$ and $R'_3$ are hydrogen atoms and $R'_{OH}$ is a $C_1$-$C_5$ hydrocarbon moiety comprising at least one hydroxyl group.

Non limitative examples of comonomers (MA) include, notably, hydroxyethyl(meth)acrylate, hydroxypropyl(meth)acrylate; hydroxyethylhexyl(meth)acrylates.

The comonomer (MA) is most preferably selected among the followings:

hydroxyethylacrylate (HEA) of formula:

2-hydroxypropyl acrylate (HPA) of either of formulae:

and mixtures thereof.

The polymer ($F_{OH}$) may be amorphous or semi-crystalline.

The term "amorphous" is hereby intended to denote a polymer ($F_{OH}$) having a heat of fusion of less than 5 J/g, preferably of less than 3 J/g, more preferably of less than 2 J/g, as measured according to ASTM D-3418-08.

The term "semi-crystalline" is hereby intended to denote a polymer ($F_{OH}$) having a heat of fusion of from 10 to 90 J/g, preferably of from 30 to 60 J/g, more preferably of from 35 to 55 J/g, as measured according to ASTM D3418-08.

The polymer ($F_{OH}$) is preferably semi-crystalline.

Non limitative examples of suitable fluorinated monomers include, notably, the followings:

$C_2$-$C_8$ perfluoroolefins, such as tetrafluoroethylene, and hexafluoropropene;

$C_2$-$C_8$ hydrogenated fluoroolefins, such as vinylidene fluoride, vinyl fluoride, 1,2-difluoroethylene and trifluoroethylene;

perfluoroalkylethylenes complying with formula $CH_2=CH-R_{f0}$, in which $R_{f0}$ is a C1-06 perfluoroalkyl;

chloro- and/or bromo- and/or iodo-$C_2$-$C_6$ fluoroolefins, like chlorotrifluoroethylene;

(per)fluoroalkylvinylethers complying with formula $CF_2=CFOR_{f1}$ in which $R_{f1}$ is a $C_1$-$C_6$ fluoro- or perfluoroalkyl, e.g. $CF_3$, $C_2F_5$, $C_3F_7$;

$CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;

(per)fluoroalkylvinylethers complying with formula $CF_2=CFOCF_2OR_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like $-C_2F_5-O-CF_3$;

functional (per)fluoro-oxyalkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;

fluorodioxoles, especially perfluorodioxoles.

Non limitative examples of suitable hydrogenated monomers include, notably, non-fluorinated monomers such as ethylene, propylene, vinyl monomers such as vinyl acetate, (meth)acrylic monomers and styrene monomers such as styrene and p-methylstyrene.

The polymer ($F_{OH}$) comprises preferably more than 25% by moles, preferably more than 30% by moles, more preferably more than 40% by moles of recurring units derived from at least one fluorinated monomer.

The polymer ($F_{OH}$) comprises preferably more than 1% by moles, preferably more than 5% by moles, more preferably more than 10% by moles of recurring units derived from at least one hydrogenated monomer different from comonomer (MA).

The fluorinated monomer can further comprise one or more other halogen atoms (Cl, Br, I). Should the fluorinated monomer be free of hydrogen atoms, it is designated as per(halo)fluoromonomer. Should the fluorinated monomer comprise at least one hydrogen atom, it is designated as hydrogen-containing fluorinated monomer.

Should the fluorinated monomer be a hydrogen-containing fluorinated monomer, such as for instance vinylidene fluoride, trifluoroethylene, vinylfluoride, the polymer ($F_{OH}$) can be either a polymer comprising, in addition to recurring units derived from at least one comonomer (MA) as defined above, recurring units derived only from said hydrogen-containing fluorinated monomer, or it can be a polymer comprising recurring units derived from at least one comonomer (MA) as defined above, from said hydrogen-containing fluorinated monomer and from at least one other monomer.

Should the fluorinated monomer be a per(halo)fluoromonomer, such as for instance tetrafluoroethylene, chlorotrifluoroethylene, hexafluoropropylene, perfluoroalkylvinylethers, the polymer ($F_{OH}$) is a polymer comprising recurring units derived from at least one comonomer (MA) as defined above, recurring units derived from said per(halo)fluoromonomer and from at least one other hydrogenated monomer different from said comonomer (MA), such as for instance ethylene, propylene, vinylethers, acrylic monomers.

Preferred polymers ($F_{OH}$) are those wherein the fluorinated monomer is chosen from the group consisting of vinylidene fluoride (VDF), tetrafluoroethylene (TFE) and chlorotrifluoroethylene (CTFE).

The polymer ($F_{OH}$) is more preferably selected from the group consisting of:
- polymers ($F_{OH}$-1) comprising recurring units derived from at least one comonomer (MA) as defined above, from at least one per(halo)fluoromonomer selected from tetrafluoroethylene (TFE) and chlorotrifluoroethylene (CTFE), and from at least one hydrogenated monomer selected from ethylene, propylene and isobutylene, optionally containing one or more additional comonomers, typically in amounts of from 0.01% to 30% by moles, based on the total amount of TFE and/or CTFE and said hydrogenated monomer(s); and
- polymers ($F_{OH}$-2) comprising recurring units derived from at least one comonomer (MA) as defined above, from vinylidene fluoride (VDF), and, optionally, from one or more fluorinated monomers different from VDF.

In polymers ($F_{OH}$-1) as defined above, the molar ratio per(halo)fluoromonomer(s)/hydrogenated comonomer(s) is typically of from 30:70 to 70:30. In polymers ($F_{OH}$-1) as defined above, the hydrogenated monomer preferably comprises ethylene, optionally in combination with other hydrogenated monomers.

Polymers ($F_{OH}$-1) wherein the per(halo)fluoromonomer is predominantly chlorotrifluoroethylene (CTFE) will be identified herein below as ECTFE copolymers; polymers ($F_{OH}$-1) wherein the per(halo)fluoromonomer is predominantly tetrafluoroethylene (TFE) will be identified herein below as ETFE copolymers.

The ECTFE and ETFE copolymers ($F_{OH}$-1) preferably comprise:
(a) from 35% to 65% by moles, preferably from 45% to 55% by moles, more preferably from 48% to 52% by moles of ethylene (E);
(b) from 65% to 35% by moles, preferably from 55% to 45% by moles, more preferably from 52% to 48% by moles of at least one of chlorotrifluoroethylene (CTFE) and tetrafluoroethylene (TFE) or mixture thereof;
(c) from 0.01% to 20% by moles, preferably from 0.05% to 18% by moles, more preferably from 0.1% to 10% by moles of at least one (meth)acrylic monomer of formula (II) as defined above.

Among polymers ($F_{OH}$-1), ECTFE polymers are preferred.

The polymer ($F_{OH}$-2) preferably comprises:
(a') at least 60% by moles, preferably at least 75% by moles, more preferably at least 85% by moles of vinylidene fluoride (VDF);
(b') optionally, from 0.1% to 15% by moles, preferably from 0.1% to 12% by moles, more preferably from 0.1% to 10% by moles of a fluorinated monomer selected from vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and
(c') from 0.01% to 20% by moles, preferably from 0.05% to 18% by moles, more preferably from 0.1% to 10% by moles of at least one (meth)acrylic monomer of formula (II) as defined above.

The polymer ($F_{OH}$) is even more preferably selected from polymers ($F_{OH}$-2) as defined above.

The metal compound of formula $X_{4-m}AY_m$ (I) can comprise one or more functional groups on any of groups X and Y, preferably on at least one group X.

In case the metal compound of formula (I) as defined above comprises at least one functional group, it will be designated as functional metal compound; in case none of groups X and Y comprises a functional group, the metal compound of formula (I) as defined above will be designated as non-functional metal compound.

Mixtures of one or more functional metal compounds and one or more non-functional metal compounds can be used in the process of the invention and in the manufacture of the hybrid composite of the invention. Otherwise, functional metal compound(s) or non-functional metal compound(s) can be separately used.

Functional metal compounds can advantageously provide for hybrid composites having functional groups so as to further modify the chemistry and the properties of the fluoropolymer hybrid organic-inorganic composite according to the invention.

The compound (M) preferably complies with formula (I-A):

$$R'_{4-m'}E(OR'')_{m'} \quad \text{(I-A)}$$

wherein m' is an integer from 1 to 4, and, according to certain embodiments, from 1 to 3, E is a metal selected from the group consisting of Si, Ti and Zr, R' and R", equal to or different from each other and at each occurrence, are independently selected from $C_1$-$C_{18}$ hydrocarbon groups, optionally comprising one or more functional groups.

As non limitative examples of functional groups, mention can be made of epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

With the aim of manufacturing fluoropolymer hybrid organic/inorganic composites which can exhibit functional behaviour in terms of hydrophilicity or ionic conductivity, functional groups of the metal compound of formula (I) will be preferably selected among carboxylic acid group (in its acid, ester, amide, anhydride, salt or halide form), sulphonic group (in its acid, ester, salt or halide form), hydroxyl group, phosphoric acid group (in its acid, ester, salt, or halide form), amine group, and quaternary ammonium group; most preferred will be carboxylic acid group (in its acid, ester, amide, anhydride, salt or halide form) and sulphonic group (in its acid, ester, salt or halide form).

Should the compound (M) be a functional metal compound, it more preferably complies with formula (I-B):

$$R^A_{4-m^*}\text{-}E^*(OR^B)_{m^*} \qquad (I\text{-}B)$$

wherein $m^*$ is an integer from 2 to 3, $E^*$ is a metal selected from the group consisting of Si, Ti and Zr, $R^A$, equal to or different from each other and at each occurrence, is a $C_1$-$C_{12}$ hydrocarbon group comprising one or more functional groups; $R^B$, equal to or different from each other and at each occurrence, is a $C_1$-$C_5$ linear or branched alkyl radical, preferably $R^B$ is methyl or ethyl.

Examples of functional metal compounds are notably vinyltriethoxysilane, vinyltrimethoxysilane, vinyltrismethoxyethoxysilane of formula $CH_2=CHSi(OC_2H_4OCH_3)_3$, 2-(3,4-epoxycyclohexylethyltrimethoxysilane) of formula:

glycidoxypropylmethyldiethoxysilane of formula:

glycidoxypropyltrimethoxysilane of formula:

methacryloxypropyltrimethoxysilane of formula:

aminoethylaminpropylmethyldimethoxysilane of formula:

aminoethylaminpropyltrimethoxysilane of formula:

3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-am inopropyltriethoxysilane, (3-acryloxypropyl)dimethylmethoxysilane, (3-acryloxypropyl)methyldichlorosilane, (3-acryloxypropyl)methyldimethoxysilane, 3-(n-allylamino)propyltrimethoxysilane, 2-(4-chlorosulfonylphenyl)ethyltrimethoxysilane, 2-(4-chlorosulphonylphenyl)ethyl trichlorosilane, carboxyethylsilanetriol, and its sodium salts, triethoxysilylpropylmaleamic acid of formula:

3-(trihydroxysilyl)-1-propane-sulphonic acid of formula $HOSO_2\text{---}CH_2CH_2CH_2\text{---}Si(OH)_3$, N-(trimethoxysilylpropyl)ethylene-diamine triacetic acid, and its sodium salts, 3-(triethoxysilyl)propylsuccinic anhydride of formula:

acetamidopropyltrimethoxysilane of formula $H_3C\text{---}C(O)NH\text{---}CH_2CH_2CH_2\text{---}Si(OCH_3)_3$, alkanolamine titanates of formula $Ti(A)_x(OR)_y$, wherein A is an amine-substituted alkoxy group, e.g. $OCH_2CH_2NH_2$, R is an alkyl group, and x and y are integers such that $x+y=4$.

Examples of non-functional metal compounds are notably trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

Under step (ii) of the process of the invention, the composition (C2) is typically manufactured by adding at least one compound (M) of formula (I) as defined above to the composition (C1).

The composition (C2) typically comprises at least one compound (M) of formula (I) as defined above in an amount comprised between 0.1% and 95% by weight, preferably between 1% and 75% by weight, more preferably between 5% and 55% by weight, based on the total weight of the polymer ($F_{OH}$) and the compound (M).

Under step (ii) of the process of the invention, the polymer(s) ($F_{OH}$) and the compound(s) (M) of formula (I) as defined above are reacted at temperatures typically comprised between 20° C. and 100° C. Temperatures between 20° C. and 90° C., preferably between 20° C. and 50° C. will be preferred.

The skilled in the art will properly select the temperature depending on the boiling point of the solvent(s) (S).

Non-limitative examples of suitable solvents (S) include, notably, the followings:

aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; dioxane, tetrahydrofuran (THF), glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether, glycol ether esters such as ethylene glycol methyl ether acetate, ethylene glycol monoethyl ether acetate, ethylene glycol monobutyl ether acetate, alcohols such as methyl alcohol, ethyl alcohol, diacetone alcohol, ketones such as acetone, methylethylketone, methylisobutyl ketone, diisobutylketone, cyclohexanone, isophorone, and linear or cyclic esters such as isopropyl acetate, n-butyl acetate, methyl acetoacetate, dimethyl phthalate, g-butyrolactone;

linear or cyclic amides such as N,N-diethylacetamide, N,N-dimethylacetamide, dimethylformamide and N-methyl-2-pyrrolidone; and dimethyl sulfoxide.

The solvent (S) is typically selected from the group consisting of ketones, linear or cyclic amides, dimethyl sulfoxide and mixtures thereof.

Very good results have been obtained using a liquid medium comprising, preferably consisting of, acetone and dimethyl sulfoxide.

It has been surprisingly found that, by increasing the amount of one or more solvents (S) in the composition (C1) of the process of the invention, the fluoropolymer fibres provided in step (iv) of the process of the invention are advantageously assembled thereby providing a fluoropolymer mat wherein fluoropolymer fibres and/or bundles of fluoropolymer fibres are advantageously bonded to each other.

The composition (C1) may further comprise at least one inorganic filler [filler (F)].

The choice of the inorganic filler [filler (F)] is not particularly limited.

The filler (F) is typically provided under the form of particles usually having an average particle size of from 0.001 µm to 100 µm, preferably of from 0.005 µm to 50 µm, more preferably of from 0.005 µm to 5 µm.

The amount of the filler (F) in the composition (C1) is preferably of from 0.1% to 50% by weight, more preferably of from 0.5% to 30% by weight, based on the total weight of the polymer ($F_{OH}$) and the filler (F).

Among fillers (F) suitable for being used in the process of the invention, mention can be made of inorganic oxides, including mixed oxides, metal sulphates, metal carbonates, metal sulfides and the like.

A class of compounds which gave particularly good results within the context of this embodiment of the present invention are notably silicates, aluminium-silicates and magnesium silicates, all optionally containing additional metals such as sodium, potassium, iron or lithium.

These silicates, aluminium-silicates and magnesium silicates, all optionally containing additional metals such as sodium, potassium, iron or lithium, can be notably smectic clays, possibly of natural origin, such as notably montmorillonites, sauconite, vermiculite, hectorite, saponite, nontronite. As an alternative, silicates, aluminium-silicates and magnesium silicates, all optionally containing additional metals such as sodium, potassium, iron or lithium, can be selected among synthetic clays, like notably fluorohectorite, hectorite, laponite.

The filler (F) may be also selected from ion-conducting inorganic filler materials.

By the term "ion-conducting" it is hereby intended to denote a material allowing electrolyte ions to flow there through.

Non-limitative examples of suitable ion-conducting inorganic filler materials include, notably, lithium ceramics such as $LiTaO_3$—$SrTiO_3$, $LiTi_2(PO_4)_3$—$Li_2O$ and $Li_4SiO_4$—$Li_3PO_4$.

Also, fillers (F) having on their surface one or more reactive groups towards the compound(s) (M) of formula (I) as defined above can be used in the process of the invention.

Among surface reactive groups, mention is notably made of hydroxyl groups.

Without being bound by this theory, the Applicant believes that reaction between at least a fraction of the hydrolysable group(s) Y of the compound (M) with at least a fraction of said surface reactive group(s) of the filler (F) can occur simultaneously with the reaction of at least a fraction of the hydrolysable group(s) Y of the compound (M) with at least a fraction of the hydroxyl group(s) of the polymer ($F_{OH}$) so that, in subsequent hydrolysis and/or polycondensation, chemical bonding between the polymer ($F_{OH}$) and the filler (F) is likely achieved through the inorganic domains obtainable by the compound (M).

The composition (C2) preferably comprises, more preferably consists of:

from 1% to 50% by weight, preferably from 5% to 20% by weight, based on the total volume of said composition, of at least one grafted fluoropolymer [polymer (Fg)] comprising pendant groups of formula -$AY_{m-1}X_{4-m}$, wherein m, Y, A and X have the same meaning as defined above, a liquid medium comprising at least one organic solvent [solvent (S)], optionally, residual amounts of at least one compound (M), and optionally, at least one inorganic filler [filler (F)].

Under step (iii) of the process of the invention, after at least partial hydrolysis and/or polycondensation reaction, the inorganic domains residues derived from the compound (M) will be present in the composition (C3) in an amount typically of from 0.1% to 95%, preferably of from 1% to 75% by weight, more preferably of from 5% to 55% by weight, based on the total weight of the polymer ($F_{OH}$) and said inorganic domains residues derived from the compound (M).

It is understood that, in particular for compounds (M) wherein A is Si, said inorganic domains residues obtainable by at least partial hydrolysis and/or polycondensation are represented by —O—Si—O— inorganic domains.

As this will be recognized by the skilled in the art, the hydrolysis and/or polycondensation reaction usually generates low molecular weight side products, which can be notably water or alcohol, as a function of the nature of the compound (M).

Under step (iii) of the process of the invention, the hydrolysis and/or polycondensation is usually carried out at room temperature or upon heating at a temperature lower than 100° C. The temperature will be selected having regards to the boiling point of the solvent(s) (S). Temperatures between 20° C. and 90° C., preferably between 20° C. and 50° C. will be preferred.

Under step (iii) of the process of the invention, the composition (C3) may further comprise at least one acid catalyst.

The selection of the acid catalyst is not particularly limited. The acid catalyst is typically selected from the group consisting of organic and inorganic acids.

Under step (iii) of the process of the invention, the acid catalyst is typically added to the composition (C2) in an amount comprised between 0.5% and 10% by weight, preferably between 1% by weight and 5% by weight.

The acid catalyst is preferably selected from the group consisting of organic acids.

Very good results have been obtained with HCl.

Under step (iv) of the process of the invention, the composition (C3) is processed by electrospinning typically by drawing one or more fluoropolymer fibres.

Under step (iv) of the process of the invention, the composition (C3) is processed by electrospinning typically by applying a voltage between a syringe tip and a collector.

Under step (iv) of the process of the invention, the composition (C3) is processed by electrospinning typically at a temperature comprised between 15° C. and 50° C.

Under step (iv) of the process of the invention, the composition (C3) is processed by electrospinning typically at a relative humidity below 50%.

The composition (C3) is processed by electrospinning preferably at a voltage ranging from 5 kV to 50 kV, preferably from 10 kV to 30 kV.

The composition (C3) is processed by electrospinning preferably at a distance between the syringe tip and the collector ranging from 5 cm to 50 cm, preferably from 10 cm to 30 cm.

The composition (C3) is processed by electrospinning preferably at a flow rate ranging from 0.001 ml/min to 10 ml/min, preferably from 0.005 ml/min to 1 ml/min.

Under step (v) of the process of the invention, the fluoropolymer fibre(s) provided in step (iv) are dried at a temperature typically comprised between 25° C. and 200° C.

Drying can be performed under modified atmosphere, e.g. under an inert gas, typically exempt notably from moisture (water vapour content of less than 0.001% v/v), or can be performed under vacuum.

The drying temperature will be selected so as to effect removal by evaporation of one or more solvents (S) from the fluoropolymer fibre(s) provided in step (iv) of the process of the invention.

Under step (vi) of the process of the invention, if any, the fluoropolymer fibre(s) provided in step (v) are advantageously submitted to compression, preferably by calendering.

Calendering can be performed by pressing the fluoropolymer fibre(s) provided in step (v) of the process of the invention between two rolls at a temperature comprised between 50° C. and 300° C.

It is understood that, under any one of steps (v) and (vi) of the process of the invention, the low molecular weight side products generated by hydrolysis and/or polycondensation reaction, which can be notably water or alcohol, as a function of the nature of the compound (M), and one or more solvents (S) are at least partially removed from the fluoropolymer fibre(s) provided in step (iv) of the process of the invention, possibly further promoting, by combined action of heat and side products removal, additional hydrolysis and/or polycondensation.

It has been found that, under step (vi) of the process of the invention, by submitting to compression the fluoropolymer fibre(s) provided in step (v) at a temperature comprised between 50° C. and 300° C., a self standing fluoropolymer mat is thereby provided which advantageously retains its porous structure while exhibiting outstanding thermo-mechanical properties.

The Applicant thinks, without this limiting the scope of the invention, that the fluoropolymer fibre(s) provided in step (vi) of the process of the invention are advantageously assembled thereby providing a fluoropolymer mat wherein the fluoropolymer fibres and/or the bundles of fluoropolymer fibres as defined above are advantageously bonded to each other.

The fluoropolymer mat provided in step (vi) of the process of the invention advantageously has a thickness ranging from 10 μm to 50 μm.

The fluoropolymer mat provided in step (vi) of the process of the invention advantageously has a porosity ranging from 50% to 70%, based on the total volume of the fluoropolymer mat.

Should the disclosure of any patents, patent applications, and publications which are incorporated herein by reference conflict with the description of the present application to the extent that it may render a term unclear, the present description shall take precedence.

DETAILED DESCRIPTION OF THE DRAWINGS

The invention will be now described in more detail with reference to the following examples whose purpose is merely illustrative and not limitative of the scope of the invention.

Raw Materials

Polymer ($F_{OH}$-A): VDF-HEA copolymer (HEA: 0.8% by moles) having a melt flow index of 9.3 g/10 min (ASTM D1238, 5 Kg, 190° C.) and a melting point of 166° C.

Polymer ($F_{OH}$—B): VDF-HFP-HEA terpolymer (HFP: 2.3% by moles; HEA: 1% by moles) having a melt flow index of 15 g/10 min (ASTM D1238, 2.16 Kg, 190° C.) and a melting point of 154° C.

SOLEF® 6008 PVDF homopolymer having a melt flow index of 6.0 g/10 min (ASTM D1238, 2.16 Kg, 230° C.) and a melting point of 172° C.

Electrospinning Apparatus and General Procedure

Electrospinning was carried out by using an in-house apparatus composed of a high voltage power supply (Spellman, SL 50 P 10/CE/230), a syringe pump (KD Scientific 200 series), a glass syringe, a stainless-steel blunt-ended needle (inner diameter=0.84 mm) connected with the power supply electrode, and a static grounded plate aluminium collector (10×10 cm²). The polymer solution was dispensed, through a PTFE tube, to the needle vertically placed on the collecting plate. Electrospinning was performed at relative humidity in the range 25-30% and a temperature around 20° C. When not specified, electrospinning experiments were always performed immediately after solution preparation (with solution kept at 20° C.).

Determination of SiO$_2$ Content

The amount of SiO$_2$ in the fluoropolymer hybrid organic/inorganic composite was measured by Energy Dispersive Spectroscopy (EDS) analysis of Silicon (Si) and Fluorine (F) elements on micrographs obtained from Scanning Electron Microscopy (SEM).

The SiO$_2$ content was determined by using the following equation (1):

$$SiO_2[\%]=([SiO_2]/([SiO_2]+[F]))\times 100 \quad (1)$$

wherein [SiO$_2$] and [F] from equation (1) are calculated using the following equations (2) and (3), respectively:

$$[SiO_2]=((Si_{EDS}\times 60)/28) \quad (2)$$

$$[F]=((F_{EDS}\times 64)/38) \quad (3)$$

wherein:
Si$_{EDS}$ and F$_{EDS}$ are the weight % of Si and F obtained by EDS,
60 is the molecular weight of SiO$_2$,
28 is the atomic weight of Si,
64 is the molecular weight of CH$_2$=CF$_2$, and
38 is the atomic weight of two F elements.

Determination of Ionic Conductivity

The membrane was put between two stainless steel electrodes and sealed in a container.

The resistance of the membrane was measured and the ionic conductivity ($\sigma$) was calculated using the following equation:

$$\text{Ionic conductivity}(\sigma)=d/(R_b\times S)$$

wherein d is the thickness [cm] of the film, R$_b$ is the bulk resistance [$\Omega\times$cm] and S is the area [cm$^2$] of the stainless steel electrode.

Measurement of the Average Diameter of the Fibre

Fibre morphology was observed with a Philips 515 scanning electron microscope (SEM) at an accelerating voltage of 15 kV. Prior to SEM analysis, samples were sputter-coated with gold. The diameter of the fiber was evaluated by averaging the data obtained by the measurement on about 100 fibres in the SEM image at 10000 magnification.

Measurement of the Thickness of the Mat

The thickness of the mat obtained by electrospinning was determined with a digital micrometer from Mahr equipped with a probe head 908H with a diameter of 12 mm. A force of 0.1 N was applied to the probe head, and the thickness was obtained by averaging the measurements on five locations on the mat. The procedure was repeated by applying to the probe head a force of 0.3 N and of 0.8 N. The thickness of the mat has then been calculated as the intercept at a force of 0 of the linear regression of the values obtained for each force applied.

Measurement of the Compressibility of the Mat

The compressibility of the mat was determined by the slope of the linear regression obtained from the thickness versus force values. Such defined compressibility, in %/N, expresses the percent reduction of the thickness of the mat obtained by applying 1 N to the probe head.

The higher the compressibility value, the softer and thus more difficult to handle the mat thereby provided.

Measurement of the Porosity of the Mat

The porosity of the mat measured by weighting a square specimen of the membrane by using the following equation:

$$\text{Porosity }[\%]=100\times[1-w/(\delta\times a\times b\times t)]$$

wherein w is the weight [g], a and b [cm] are the sides of the specimen, t is thickness of the mat [cm] and $\delta$ [g/ml] is the density of composite. In the Examples here below, $\delta$ was 1.78 g/ml.

Measurement of the Dimensional Stability of the Mat

Two 1×1 cm square specimens were cut from the mat, immersed for 1 minute in N,N-dimethylformamide (DMF) and then dried for 24 hours in an oven. The shrinkage of the mat was measured as the average variation of the dimensions of these two square specimens before and after treatment in DMF.

Example 1—Manufacture of a Fluoropolymer Mat

In a glass vial containing a magnetic PTFE stir bar, a fluoropolymer composition was provided, said composition comprising:
10% by weight, based on the total volume of the composition, of the polymer (F$_{OH}$-A), and
a 70:30 by volume mixture of acetone and dimethyl sulfoxide. The composition thereby provided was stirred at 300 rpm for 40 minutes at room temperature. Then, tetraethoxysilane (TEOS) was added drop-wise to the stirred solution. The polymer (F$_{OH}$-A)/TEOS ratio in the composition was kept at 0.38 by weight.

The content of —O—Si—O— inorganic domains, calculated assuming complete TEOS hydrolysis/polycondensation, was 43% by weight referred to the total solid content of the mixture. The stirring was kept for other 10 minutes at room temperature.

To promote the hydrolysis/polycondensation of the TEOS, 3 mg of a 37% w/v solution of HCl were added to the vial. The solution was stirred overnight at room temperature at 300 rpm and, just before electrospinning, at 300 rpm at 40° C. for 10 minutes.

A mat was then manufactured by processing by electrospinning within 24 hours, according to the procedure detailed hereinabove, the fluoropolymer composition thereby provided at an applied voltage of 19 kV, a flow rate of 0.01 ml/min and a distance between the syringe tip and the collector of 15 CM.

The mat thereby provided was then dried at 150° C. for 3 hours in an oven.

The average diameter of the fibre was 210±40 nm.

The content of —O—Si—O— inorganic domains was 28% by weight, as measured by SEM/EDS analysis.

The thickness of the mat was 53±5 µm.

The compressibility of the mat was 41%/N.

The porosity of the mat was 85%.

The ionic conductivity of the mat was 1.9×10$^{-3}$ S/cm.

The mechanical properties of the mat at 23° C. are set forth in Table 1 here below:

TABLE 1

| Elastic Modulus [MPa] | Yield Stress [MPa] | Yield Strain [%] | Breaking Stress [MPa] | Breaking Strain [%] |
|---|---|---|---|---|
| 365 | 10 | 4.4 | 14.4 | 28 |

The mechanical properties were measured at 23° C. according to ASTM D638 standard procedure with a specimen type V at a grip distance of 25.4 mm, a L0 of 21.5 mm and a speed of testing of 1-50 mm/min. The test was started at a speed of 1 mm/min to determine the elastic modulus and then the speed was moved to 50 mm/min to determine the other properties listed in Table 1.

Example 2—Manufacture of a Fluoropolymer Mat

The fluoropolymer mat obtained in Example 1 was placed in a press at 200° C. for 30 minutes under a pressure of 1.5 ton.

After thermal treatment, the thickness of the mat was 22±2 μm. The compressibility of the mat was 17%/N.

The porosity of the mat was reduced to 64% but the membrane advantageously kept its porous structure.

The ionic conductivity of the mat was $1.02 \times 10^{-4}$ S/cm.

Example 3—Manufacture of a Fluoropolymer Mat

In a glass vial containing a magnetic PTFE stir bar, a fluoropolymer composition was provided, said composition comprising:
- 13% by weight, based on the total volume of the composition, of the polymer ($F_{OH}$—B), and
- a 80:20 by volume mixture of acetone and dimethyl sulfoxide.

The composition thereby provided was stirred at 300 rpm for 40 minutes at room temperature. Then, tetraethoxysilane (TEOS) was added drop-wise to the stirred solution. The polymer ($F_{OH}$-B)/TEOS ratio in the composition was kept at 0.67 by weight.

The content of —O—Si—O— inorganic domains, calculated assuming complete TEOS hydrolysis/polycondensation, was 30% by weight referred to the total solid content of the mixture. The stirring was kept for other 10 minutes at room temperature.

To promote the hydrolysis/polycondensation of the TEOS, a 0.1 M solution of HCl was added to the vial in a HCl:TEOS molar ratio of 2:1. The solution was stirred at room temperature for 10 minutes.

A mat was then manufactured by processing by electrospinning within 48 hours, according to the procedure detailed hereinabove, the fluoropolymer composition thereby provided at an applied voltage of 20 kV, a flow rate of 0.01 ml/min and a distance between the syringe tip and the collector of 20 cm.

The mat thereby provided was then dried at 150° C. for 3 hours in an oven.

The average diameter of the fibre was 280±80 nm.

The content of —O—Si—O— inorganic domains was 30% by weight, as measured by SEM/EDS analysis.

The thickness of the mat was about 20 μm.

The shrinkage of the mat was less than 5%.

Example 4—Manufacture of a Fluoropolymer Mat

A mat was manufactured by processing by electrospinning, according to the procedure detailed hereinabove, the fluoropolymer composition provided in Example 3 onto a porous polyethylene film having a porosity of 40% and a thickness of about 25 μm adhered to the static grounded plate aluminium collector of the electrospinning apparatus.

The plate was moved during the electrospinning processing through a boustrophedon trajectory.

The mat so obtained was dried at 80° C. for 3 hours in an oven and then placed in a press at 80° C. for 2 minutes under a pressure of 1 ton. The peeling strength of the fluoropolymer mat to the porous polyethylene film was higher than the mechanical strength of the mat.

The ionic conductivity of the mat was $1.8 \times 10^{-4}$ S/cm.

After two hours, the shrinkage of the mat was less than 5% as compared with the dimensions of the uncoated porous polyethylene film.

The wettability of the mat in an electrolyte solution was 4.2 times higher than the wettability of the uncoated porous polyethylene film. The wettability was measured by using the Wicking test: a 50×5 mm mat specimen was placed vertically in contact with an electrolyte solution and, after 40 minutes, the wetting level of the mat by the electrolyte solution was recorded. The higher the wetting level of the mat after 40 minutes versus a reference, the higher the wettability of the mat by the electrolyte solution.

COMPARATIVE EXAMPLE 1

Manufacture of a Fluoropolymer Mat

The same procedure as detailed under Example 1 was followed but using Polymer ($F_{OH}$-A) without adding TEOS.

The average diameter of the fibre was 220±40 nm.

The thickness of the mat was 96±8 μm.

The mat thereby provided was then tested as in Example 2. A continuous film with no porous structure was obtained.

Comparative Example 2—Manufacture of a Fluoropolymer Mat

The same procedure as detailed under Example 1 was followed but using SOLEF® 6008 PVDF homopolymer.

The average diameter of the fibre was 200±50 nm.

The thickness of the mat was 35±4 μm.

The compressibility of the mat was 59%/N.

The content of —O—Si—O— inorganic domains was 10% by weight, as measured by SEM/EDS analysis.

The ionic conductivity of the mat was $2.5 \times 10^{-3}$ S/cm.

Comparative Example 3—Manufacture of a Fluoropolymer Mat

The same procedure as detailed under Example 1 was followed but using SOLEF® 6008 PVDF homopolymer without adding TEOS.

The average diameter of the fibre was 210±40 nm.

The mat thereby provided was then tested as in Example 2. A continuous film with no porous structure was obtained.

Example 5—Use of the Fluoropolymer Mat as Separator in a Lithium-Ion Battery

A coin cell was prepared by placing the electrospun membrane as prepared according to Example 1 between a Lithium metal negative electrode and a positive electrode containing LiFePO$_4$ as active material, SOLEF® 5130 PVDF as binder and Super P Li conductive carbon black. The coin cell was filled with 200 μl of Selectilyte® LP30 electrolyte consisting of a 1 M solution of LiPF$_6$ in ethylene carbonate/dimethyl carbonate (1:1 weight ratio).

The discharge capacity values of the coin cell so obtained at different discharge rates are set forth in Table 2 here below:

TABLE 2

| Rate | | Average Discharge [mAh/g] | [%] |
| --- | --- | --- | --- |
| 5 | Discharge 5D | 58.2 | 37.1 |
| 2 | Discharge 2D | 116.5 | 74.2 |
| 1 | Discharge D | 133.6 | 85.0 |
| 0.33 | Discharge D/3 | 149.0 | 94.9 |
| 0.2 | Discharge D/5 | 151.3 | 96.4 |
| 0.1 | Discharge D/10 | 155.0 | 98.7 |
| 0.05 | Discharge D/20 | 154.8 | 98.6 |

It has been found that a self standing fluoropolymer mat is advantageously provided by the process according to the invention, wherein at least a fraction of the hydroxyl groups of the polymer ($F_{OH}$) is reacted with at least a fraction of the hydrolysable groups Y of the compound (M), said mat advantageously having a high content of inorganic domains while exhibiting, after drying and, optionally, calendering steps, outstanding thermo-mechanical resistance properties up to temperatures of about 300° C.

It has been also found that a self standing fluoropolymer mat is advantageously provided by the process according to the invention, wherein at least a fraction of the hydroxyl groups of the polymer ($F_{OH}$) is reacted with at least a fraction of the hydrolysable groups Y of the compound (M), said mat advantageously exhibiting lower compressibility values and successfully maintaining, after drying and, optionally, calendering steps, its fibrous structure and thus its inherent porosity.

The invention claimed is:

1. A process for manufacturing one or more fluoropolymer fibres, said process comprising:
    contacting a liquid composition (C1) comprising:
        at least one fluoropolymer comprising at least one hydroxyl end group [polymer ($F_{OH}$)], and
        a liquid medium comprising at least one organic solvent (S);
    with at least one metal compound (M) of formula (I):

$$X_{4-m}AY_m \qquad (I)$$

wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group, thereby providing a liquid composition (C2);
    submitting composition (C2) to at least partial hydrolysis and/or polycondensation, thereby providing a liquid composition (C3) comprising at least one fluoropolymer hybrid organic/inorganic composite;
    processing composition (C3) by electrospinning, thereby providing one or more fluoropolymer fibres;
    drying the fluoropolymer fibre(s), thereby providing one or more dried fluoropolymer fibres; and
    optionally, submitting to compression the dried fluoropolymer fibre(s) at a temperature comprised between 50° C. and 300° C., thereby providing compressed fluoropolymer fibres.

2. The process according to claim 1, wherein polymer ($F_{OH}$) comprises recurring units derived from at least one fluorinated monomer and at least one comonomer comprising at least one hydroxyl end group [comonomer (MA)].

3. The process according to claim 2, wherein comonomer (MA) is at least one comonomer of formula (II-A):

$$(II-A)$$

wherein $R'_1$, $R'_2$ and $R'_3$ are hydrogen atoms and $R'_{OH}$ is a $C_1$-$C_5$ hydrocarbon moiety comprising at least one hydroxyl group.

4. The process according to claim 1, wherein polymer ($F_{OH}$) is selected from the group consisting of:
    polymers ($F_{OH}$-1) comprising recurring units derived from at least one comonomer (MA) as defined above, from at least one per(halo)fluoromonomer selected from tetrafluoroethylene (TFE) and chlorotrifluoroethylene (CTFE), and from at least one hydrogenated monomer selected from ethylene, propylene and isobutylene, optionally containing one or more additional comonomers; and
    polymers ($F_{OH}$-2) comprising recurring units derived from at least one comonomer (MA) as defined above, from vinylidene fluoride (VDF), and, optionally, from one or more fluorinated monomers different from VDF.

5. The process according to claim 1, wherein composition (C2) is obtainable by reacting at least a fraction of the hydroxyl group(s) of the polymer(s) ($F_{OH}$) with at least a fraction of the hydrolysable group(s) Y of the compound(s) (M), said composition (C2) comprising:
    at least one grafted fluoropolymer [polymer (Fg)] comprising pendant groups of formula -$AY_{m-1}X_{4-m}$, wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group,
    a liquid medium comprising at least one organic solvent (S), and
    optionally, residual amounts of at least one compound (M) of formula (I):

$$X_{4-m}AY_m \qquad (I)$$

wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group.

6. The process according to claim 1, wherein the one or more fluoropolymer fibres are assembled, thereby providing either a bundle of fluoropolymer fibres or a fluoropolymer mat.

7. A fluoropolymer fibre obtainable by the process according to claim 1.

8. A fluoropolymer fibre comprising:
    at least one fluoropolymer hybrid organic-inorganic composite comprising fluoropolymer domains consisting of chains obtainable by the polymer (Fg) and inorganic domains consisting of residues obtainable by the compound (M),
    optionally, at least one compound (M) of formula (I):

$$X_{4-m}AY_m \qquad (I)$$

wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group, and
    optionally, at least one derivative obtainable by at least partial hydrolysis and/or polycondensation of at least one compound (M) of formula (I).

9. A fluoropolymer mat obtainable by the process according to claim 1.

10. The fluoropolymer mat according to claim 9, comprising fluoropolymer fibres and/or bundles of fluoropolymer fibres, dried fluoropolymers fibres and/or bundles of dried fluoropolymers fibres or compressed fluoropolymers fibres and/or bundles of compressed fluoropolymers fibres as provided in claim 1.

11. The fluoropolymer mat according to claim 10, wherein said fluoropolymer mat is a non-woven fabric.

12. The fluoropolymer mat according to claim 9, wherein said fluoropolymer mat has a porosity ranging from 10% to 90%, based on the total volume of the fluoropolymer mat.

13. A multilayer assembly comprising:
    at least one fluoropolymer mat according to claim 9, and
    at least one substrate layer,
wherein at least one surface of said fluoropolymer mat is adhered to at least one surface of said substrate layer.

14. An electrochemical device comprising the fluoropolymer mat according to claim 9.

15. A filtration membrane comprising the fluoropolymer mat according to claim 9.

16. An electrochemical device comprising the multilayer assembly according to claim 13.

17. A filtration membrane comprising the multilayer assembly according to claim 13.

18. The fluoropolymer mat according to claim 12, wherein said fluoropolymer mat has a porosity ranging from 50% to 70%, based on the total volume of the fluoropolymer mat.

19. The fluoropolymer fibre of claim 8, wherein the fluoropolymers fibre consists of:
    at least one fluoropolymer hybrid organic-inorganic composite consisting of fluoropolymer domains consisting of chains obtainable by the polymer (Fg) and inorganic domains consisting of residues obtainable by the compound (M),
    optionally, at least one compound (M) of formula (I) here below:

$$X_{4-m}AY_m \qquad (I)$$

wherein X is a hydrocarbon group, optionally comprising one or more functional groups, m is an integer from 1 to 4, A is a metal selected from the group consisting of Si, Ti and Zr, and Y is a hydrolysable group selected from the group consisting of an alkoxy group, an acyloxy group and a hydroxyl group, and
    optionally, at least one derivative obtainable by at least partial hydrolysis and/or polycondensation of at least one compound (M) of formula (I).

* * * * *